United States Patent
Tacquet

[19]

[11] Patent Number: 5,970,929
[45] Date of Patent: Oct. 26, 1999

[54] TURBOCHARGED 4 STROKE DIESEL ENGINE WITH A VARIABLE CAMSHAFT TIMING SYSTEM

[75] Inventor: Maurice A Tacquet, Villeneuve d'Ascq, France

[73] Assignee: Maurice Tacquet, Villeneuve d'Ascq, France

[21] Appl. No.: 08/732,328

[22] PCT Filed: Jan. 27, 1997

[86] PCT No.: PCT/FR97/00159

§ 371 Date: Sep. 23, 1997

§ 102(e) Date: Sep. 23, 1997

[30] Foreign Application Priority Data

Jan. 26, 1996 [FR] France ................................. 96 01311

[51] Int. Cl.$^6$ ................................. F01L 1/34; F02D 13/02
[52] U.S. Cl. ................................. 123/90.15; 123/90.17
[58] Field of Search ................................. 123/90.15, 90.16, 123/90.17; 60/605.1

[56] References Cited

U.S. PATENT DOCUMENTS

| | | | |
|---|---|---|---|
| 4,703,734 | 11/1987 | Aoyama et al. | 123/90.15 |
| 5,020,487 | 6/1991 | Kruger | 123/90.15 |
| 5,396,874 | 3/1995 | Hitomi et al. | 123/90.15 |
| 5,421,308 | 6/1995 | Hitomi et al. | 123/90.15 |

*Primary Examiner*—Weilun Lo

[57] ABSTRACT

The objects of the invention are to highly turbocharge 4 stroke diesel engines without reaching too high combustion pressure and with low fuel consumption and low emissions.

These objects of the invention are attained by a large variation of camshaft timing which gives to the engine either a high compression ratio for easy starting or an extremely low compression ratio for high load. The exhaust valves are closed before the inlet valves open in order that it always remains in the cylinders a part of the burned gases from the previous cycle.

2 Claims, 1 Drawing Sheet

TURBOCHARGED 4 STROKE DIESEL ENGINE WITH A VARIABLE CAMSHAFT TIMING SYSTEM

BACKGROUND OF THE INVENTION

1. Field of the Invention

For specific applications such as heavy armored vehicles, high speed boats, transportable generating sets, the diesel engine market requires diesel engines with a very high power density. This means very high turbocharged engines with high b.m.e.p.(brake mean effective pressure). The present Invention brings a way to make such engines with low fuel consumption and low emissions.

2. Description of the Related Art

With given swept volume and revolution per minute, an increase of the engines output need bigger amount of air for combustion. This amount of air depends on the inlet pressure. But the increase is limited because the higher is the inlet pressure, the higher is the pressure at the end of the compression stroke and the higher is the combustion pressure. A high combustion pressure may cause mechanical stresses in most of the components of the engine like the crankshaft. In addition to that, a high combustion pressure reduces the oil film thickness of the bearings and the life span of the piston rings.

One solution for maintaining the combustion pressure at a limited high level consists of reducing the compression ratio of the engine. But a low compression ratio makes the starting difficult and sometimes impossible. This is why some low compression ratio engines have an additional external combustion chamber. That combustion chamber must be started before the engine in order to give energy to the turbocharger. The combustion chamber and the turbocharger work together in a loop around the engine. When the air given by the turbocharger reaches a sufficient pressure and temperature, the engine can be started. Thanks to such combustion chamber, some engines run at a bmep of 35 bars. But the control of the combustion chamber, the engine starting phase and the idle are very sophisticated. The combustion chamber must be "on" all the time and the fuel consumption of these engines is rather high. The present invention offers a better solution for getting an output increase with a low compression ratio.

BRIEF SUMMARY OF THE INVENTION

The main object of the Invention is to be able to build a diesel engine with a very high b.m.e.p. (brake mean effective pressure), low b.s.f.c. (brake specific fuel consumption) and low emissions. This object is attained with the combination of:

- a large variation in the timing of the valves without modifying the timing between the cams themselves (at least 45° measured on the crankshaft)
- a retention in the cylinders of some burned gases from the previous cycle. The cam profiles and timing are chosen in such a way that the exhaust valve is closed before the inlet valve opens.

The advantages of the present invention are the following:

a) High power density:

With this invention, it becomes possible to reach very high output of an engine because the very low compression ratio permits to feed the engine with fresh air under high pressure without reaching high combustion pressure which could have induced too high stresses on mechanical parts of the engine. The hot gases from the previous cycle which are kept into the cylinder become very hot after the compression stroke and ensure the short ignition delay which is needed for a good combustion.

b) Low fuel consumption:

When the engine runs at full load, the camshaft is in the backward position. The late closing of the inlet valve gives the low compression ratio and the late opening of the exhaust valve gives to the engine a high expansion ratio which increases the overall efficiency of the engine. This is the great advantage of the asymetrical cycle. The camshaft timing makes possible to control and optimise the amount of energy which is given to the turbochargers and to use machines with high efficiency.

c) Low emissions.

The low compression ratio reduces the temperature of the air at the end of the compression stroke. Because the cams profile and the timing have been chosen in order to have no scavenging of fresh air, it remains some hot burned gases from the previous cycle. At the end of the compression stroke, there are in the combustion chamber:

Burned gases which have been recompressed and have reached a very high temperature but with low oxygen content.

Fresh air under low compression and, therefore, at low temperature with high oxygen content. This is the ideal situation to have a very short ignition delay and a low production of NOx.

In some cases, as with 4,8,16 cylinder engines, it is possible to connect some cylinder exhaust ports so that some pressure pulse in the exhaust manifold increases the amount of exhaust gases which will be kept in the cylinder. With some combustion chamber designs, as it is possible with concentric valves, the stratification between burned gases and fresh air can make possible to obtain the same effect with less amount of burned gases in the cylinder and, of course, lower temperature of the cycle.

In short, this invention gives very interesting advantages such as:

Possible improvement of most existing engines.

Huge output increase with low increase of mechanical and thermal stresses.

Short ignition delay.

Possible use of various fuel with low cetane number.

Low fuel consumption due to the asymmetrical cycle.

Low pollution, specially NOx.

BRIEF DESCRIPTION OF THE SEVERAL VIEWS OF THE DRAWINGS (see FIG. 1 and 2)

EO means "exhaust valve opening"
EC means "exhaust valve closing"
IO means "inlet valve opening"
IC means "inlet valve closing"
TDC means "Top Dead Center"
BDC means "Bottom Dead Center"
"C" shows the compression stroke
"E" shows the expansion stroke The FIG. 1 shows the timing of the valves at the starting phase The FIG. 2 shows the timing of the valves at full load operation

DETAILED DESCRIPTION OF THE INVENTION

The Invention relates to a high turbocharged 4 stroke diesel engine with inlet and exhaust valves driven by a camshaft. The camshaft of the engine is driven by the crankshaft through a positive transmission like pinions or chain. Between the crankshaft and the camshaft, there is a variable timing device of an existing type such as described in U.S. Pat. No. 5,107,804 (Apr. 28, 1992) or French Patent No: 1,085,087 (Jul. 21, 1954). The only one device will change identically the timing of all valves.

Figure 1:
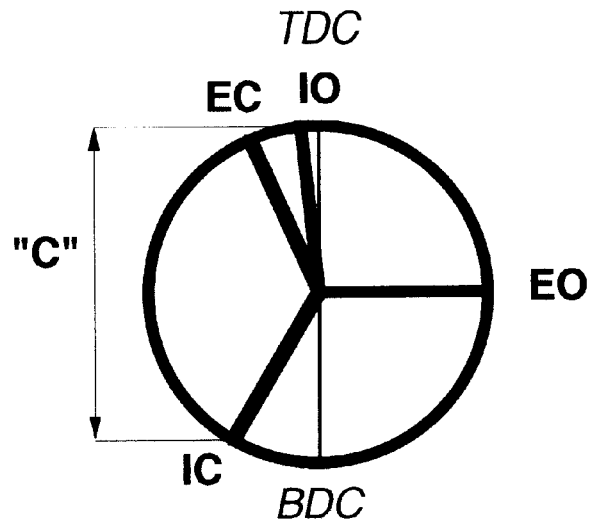
Figure 2:
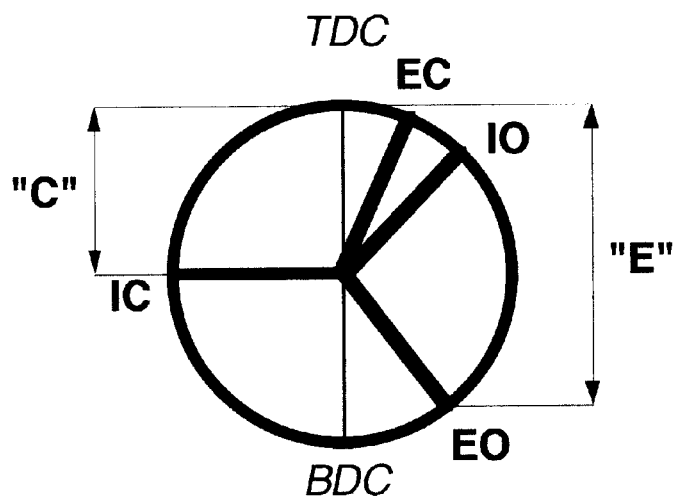

1) Effect of the inlet valve closing timing: When starting the engine, (FIG. 1) the inlet valves open near the Top Dead Center and close near the Bottom Dead Center. The engine has a complete stroke to breathe it's air and a complete stroke to compress it. The compression ratio is high and the first combustions start easily. The exhaust valves open early and a lot of energy is given to the turbocharger. The camshaft timing can be advanced for idle or low load running. When the engine runs at high load, (FIG. 2) the delay in closing the inlet valves reduces the effective compression stroke and consequently the effective compression ratio. A low compression ratio makes possible to increase the pressure of turbocharging without increasing the pressure at the end of the compression stroke and the combustion pressure. The variation in the timing of the valves will depend on the inlet pressure, but will be large enough (at least 45° and in some cases as much as 60°) to obtain a reduction of the compression ratio for a high turbocharged engine.

2) Effect of the exhaust valve opening timing: When the engine is running at high load, the timing of the camshaft will be in a maximum forward position and the exhaust valves open late. The expansion stroke is at its maximum and this is the best condition to transfer the gases energy into the mechanical power. When running at partial loads and speeds, the opening of the exhaust valves can be modified in order to optimise the efficiency of the turbochargers and the engine itself.

3) Effect of the exhaust valve closing timing: In any case, the exhaust valves close before the inlet valves open in order to prevent any scavenging and to keep some burned gases from the previous cycle into the cylinder for the next cycle. But the exhaust cam profile and timing could be chosen in order to optimise the amount of hot gases that will be kept. The design of the exhaust manifold can be chosen so that the closing of the exhaust valves would be synchronised with a pressure pulse in the exhaust manifold coming from the opening of exhaust valve of another cylinder. This can be done on the 4,8,16 cylinder engines.

4) Effect of the inlet valve opening timing: The inlet valves open after the exhaust valves closing in order that there is no scavenging of the combustion chamber with some fresh air.

I claim:

1. Four stroke Reciprocating Internal Combustion Engine (RICE) working with one or more turbochargers, with at least one inlet valve and one outlet valve per cylinder and with the inlet and outlet valves driven by respective cams and valve train, characterized in that the inlet valves opening starts after the exhaust valves have closed in order to prevent scavenging of the combustion chamber with fresh gases and in that it is equiped with a Variable Camshaft Timing device that can change the timing between the cams and a crankshaft without modifying the timing between the inlet and outlet cams and able to change the timing of at least 45 degrees of crankshaft rotation to provide a high compression ratio when starting the engine and an extremely low compression ratio when running at full load.

2. RICE as claimed in claim 1, wherein the cam profiles and timing and the connections between the cylinder and exhaust manifold are chosen in such a way that the pressure pulses in the exhaust manifold increase the amount of burned gases that are trapped in the cylinders.

* * * * *